(12) United States Patent
Gower et al.

(10) Patent No.: US 7,512,762 B2
(45) Date of Patent: Mar. 31, 2009

(54) SYSTEM, METHOD AND STORAGE MEDIUM FOR A MEMORY SUBSYSTEM WITH POSITIONAL READ DATA LATENCY

(75) Inventors: Kevin C. Gower, LaGrangeville, NY (US); Kevin W. Kark, Poughkeepsie, NY (US); Mark W. Kellogg, Henrietta, NY (US); Warren E. Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 10/977,038

(22) Filed: Oct. 29, 2004

(65) Prior Publication Data

US 2006/0095701 A1    May 4, 2006

(51) Int. Cl.
*G06F 13/00* (2006.01)
*G06F 12/00* (2006.01)

(52) U.S. Cl. .................. 711/167; 711/154; 710/52; 365/194

(58) Field of Classification Search .......... 365/194; 711/167; 710/52
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | |
| 4,028,675 A | 6/1977 | Frankenburg | 711/106 |
| 4,135,240 A | 1/1979 | Ritchie | |
| 4,472,780 A | 9/1984 | Chenoweth et al. | |
| 4,475,194 A | 10/1984 | LaVallee et al. | 371/10 |
| 4,486,739 A | 12/1984 | Franaszek et al. | 340/347 DD |
| 4,641,263 A | 2/1987 | Perlman et al. | |
| 4,654,857 A | 3/1987 | Samson et al. | |
| 4,723,120 A | 2/1988 | Petty, Jr. | 340/825.02 |
| 4,740,916 A | 4/1988 | Martin | 364/200 |
| 4,796,231 A | 1/1989 | Pinkham | 385/189.05 |
| 4,803,485 A | 2/1989 | Rypinski | 370/452 |
| 4,833,605 A | 5/1989 | Terada et al. | 364/200 |

(Continued)

FOREIGN PATENT DOCUMENTS

EP    0470734 A1    2/1992

(Continued)

OTHER PUBLICATIONS

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

(Continued)

*Primary Examiner*—Matt Kim
*Assistant Examiner*—Michael C Krofcheck
(74) *Attorney, Agent, or Firm*—Cantor Colburn LLP; Lynn Augspurger

(57) ABSTRACT

A memory subsystem with positional read data latency that includes a cascaded interconnect system with one or more memory modules, a memory controller and one or more memory busses. The memory controller includes instructions for providing positional read data latency. The memory modules and the memory controller are interconnected by a packetized multi-transfer interface via the memory busses.

7 Claims, 11 Drawing Sheets

U.S. PATENT DOCUMENTS

| | | | |
|---|---|---|---|
| 4,839,534 A | 6/1989 | Clasen | 307/269 |
| 4,943,984 A | 7/1990 | Pechanek et al. | 375/109 |
| 4,985,828 A | 1/1991 | Shimizu et al. | |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,049 A | 11/1993 | Takasugi | |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | |
| 5,475,690 A | 12/1995 | Burns et al. | 370/105.3 |
| 5,513,135 A | 4/1996 | Dell et al. | 365/52 |
| 5,522,064 A | 5/1996 | Aldereguia et al. | |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | |
| 5,666,480 A | 9/1997 | Leung et al. | 395/180 |
| 5,684,418 A | 11/1997 | Yanagiuchi | |
| 5,764,155 A | 6/1998 | Kertesz et al. | 340/825.08 |
| 5,822,749 A | 10/1998 | Agarwal | |
| 5,852,617 A | 12/1998 | Mote, Jr. | 714/726 |
| 5,870,325 A | 2/1999 | Nielsen et al. | 365/63 |
| 5,872,996 A | 2/1999 | Barth et al. | 395/853 |
| 5,917,760 A * | 6/1999 | Millar | 365/194 |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,973,591 A | 10/1999 | Becjtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | |
| 6,078,515 A | 6/2000 | Nielsen et al. | 365/63 |
| 6,081,868 A | 6/2000 | Brooks | |
| 6,085,276 A * | 7/2000 | VanDoren et al. | 710/240 |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | |
| 6,170,059 B1 | 1/2001 | Pruett et al. | |
| 6,173,382 B1 | 1/2001 | Dell et al. | 711/170 |
| 6,185,718 B1 | 2/2001 | Dell et al. | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,260,127 B1 | 7/2001 | Olarig et al. | 711/167 |
| 6,262,493 B1 | 7/2001 | Garnett | |
| 6,292,903 B1 | 9/2001 | Coteus et al. | 713/401 |
| 6,301,636 B1 | 10/2001 | Schultz et al. | 711/108 |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,357,018 B1 | 3/2002 | Stuewe et al. | |
| 6,370,631 B1 | 4/2002 | Dye | |
| 6,378,018 B1 | 4/2002 | Tsern et al. | 710/129 |
| 6,381,685 B2 | 4/2002 | Dell et al. | |
| 6,393,528 B1 | 5/2002 | Arimilli et al. | |
| 6,408,398 B1 | 6/2002 | Frecker et al. | |
| 6,446,174 B1 | 9/2002 | Dow | |
| 6,467,013 B1 | 10/2002 | Nizar | |
| 6,473,836 B1 | 10/2002 | Ikeda | |
| 6,477,614 B1 | 11/2002 | Leddige et al. | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Windmer | 375/242 |
| 6,496,910 B1 | 12/2002 | Baentsch et al. | |
| 6,499,070 B1 | 12/2002 | Whetsel | |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,526,469 B1 | 2/2003 | Drehmel et al. | 710/306 |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | |
| 6,587,912 B2 | 7/2003 | Leddige et al. | |
| 6,590,827 B2 | 7/2003 | Chang et al. | |
| 6,594,748 B1 * | 7/2003 | Lin | 711/167 |
| 6,601,121 B2 | 7/2003 | Singh et al. | 710/112 |
| 6,601,149 B1 | 7/2003 | Brock et al. | |
| 6,611,905 B1 | 8/2003 | Grundon et al. | 711/167 |
| 6,622,217 B2 | 9/2003 | Gharachorico et al. | 711/141 |
| 6,625,687 B1 | 9/2003 | Halbert et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,671,376 B1 | 12/2003 | Koto et al. | 380/210 |
| 6,678,811 B2 | 1/2004 | Rentschler et al. | 711/167 |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,754,762 B1 | 6/2004 | Curley | |
| 6,766,389 B2 | 7/2004 | Hayter et al. | |
| 6,775,747 B2 | 8/2004 | Venkatraman | |
| 6,791,555 B1 | 9/2004 | Radke et al. | |
| 6,792,495 B1 | 9/2004 | Garney et al. | |
| 6,839,393 B1 | 1/2005 | Sidiropoulos | 375/371 |
| 6,877,076 B1 | 4/2005 | Cho et al. | |
| 6,877,078 B2 | 4/2005 | Fujiwara et al. | |
| 6,882,082 B2 | 4/2005 | Greeff et al. | |
| 6,889,284 B1 | 5/2005 | Nizar et al. | |
| 6,938,119 B2 | 8/2005 | Kohn et al. | |
| 6,944,084 B2 | 9/2005 | Wilcox | |
| 6,949,950 B2 | 9/2005 | Takahaski et al. | |
| 6,977,536 B2 | 12/2005 | Chin-Chieh et al. | 327/116 |
| 6,993,612 B2 | 1/2006 | Porterfield | |
| 7,039,755 B1 | 5/2006 | Helms | |
| 7,076,700 B2 | 7/2006 | Rieger | |
| 7,133,790 B2 | 11/2006 | Liou | |
| 7,133,972 B2 | 11/2006 | Jeddeloh | |
| 7,177,211 B2 | 2/2007 | Zimmerman | |
| 7,206,962 B2 | 4/2007 | Deegan | |
| 7,216,196 B2 | 5/2007 | Jeddeloh | |
| 7,266,634 B2 | 9/2007 | Ware et al. | |
| 7,321,979 B2 | 1/2008 | Lee | |
| 2001/0000822 A1 | 5/2001 | Dell et al. | 711/170 |
| 2001/0003839 A1 | 6/2001 | Kondo | |
| 2001/0029566 A1 | 10/2001 | Woo | |
| 2002/0019926 A1 | 2/2002 | Huppenthal et al. | 712/15 |

| | | | |
|---|---|---|---|
| 2002/0038405 A1 | 3/2002 | Leddige et al. | |
| 2002/0059439 A1* | 5/2002 | Arroyo et al. | 709/230 |
| 2002/0083255 A1 | 6/2002 | Greeff et al. | 710/305 |
| 2002/0103988 A1 | 8/2002 | Dornier | |
| 2002/0112119 A1 | 8/2002 | Halbert et al. | |
| 2002/0112194 A1 | 8/2002 | Uzelac | 713/500 |
| 2002/0124195 A1 | 9/2002 | Nizar | |
| 2002/0124201 A1 | 9/2002 | Edwards et al. | |
| 2002/0147898 A1 | 10/2002 | Rentschler et al. | |
| 2002/0174274 A1 | 11/2002 | Wu et al. | |
| 2003/0009632 A1 | 1/2003 | Arimilli et al. | |
| 2003/0028701 A1 | 2/2003 | Rao et al. | |
| 2003/0033364 A1 | 2/2003 | Garnett et al. | 709/203 |
| 2003/0051055 A1 | 3/2003 | Parrella et al. | |
| 2003/0056183 A1 | 3/2003 | Kobayahi | |
| 2003/0084309 A1 | 5/2003 | Kohn | 713/189 |
| 2003/0090879 A1 | 5/2003 | Doblar et al. | 361/728 |
| 2003/0105938 A1 | 6/2003 | Cooksey et al. | |
| 2003/0126363 A1 | 7/2003 | David | |
| 2003/0223303 A1 | 12/2003 | Lamb et al. | 365/230.06 |
| 2003/0236959 A1 | 12/2003 | Johnson et al. | 711/167 |
| 2004/0006674 A1 | 1/2004 | Hargis et al. | 711/156 |
| 2004/0049723 A1 | 3/2004 | Obara | 714/729 |
| 2004/0098549 A1 | 5/2004 | Dorst | |
| 2004/0117588 A1 | 6/2004 | Arimilli et al. | |
| 2004/0128474 A1 | 7/2004 | Vorbach | 712/10 |
| 2004/0163028 A1 | 8/2004 | Olarig | |
| 2004/0165609 A1 | 8/2004 | Herbst et al. | |
| 2004/0199363 A1 | 10/2004 | Bohizic et al. | |
| 2004/0205433 A1 | 10/2004 | Gower et al. | |
| 2004/0230718 A1 | 11/2004 | Polzin et al. | |
| 2004/0246767 A1 | 12/2004 | Vogt | 365/154 |
| 2004/0250153 A1 | 12/2004 | Vogt | 713/500 |
| 2004/0260909 A1 | 12/2004 | Lee et al. | |
| 2004/0260957 A1 | 12/2004 | Jeddeloh et al. | |
| 2005/0023560 A1 | 2/2005 | Ahn et al. | 257/200 |
| 2005/0033906 A1 | 2/2005 | Mastronarde et al. | |
| 2005/0044305 A1 | 2/2005 | Jakobs et al. | |
| 2005/0044457 A1 | 2/2005 | Jeddeloh | |
| 2005/0050237 A1 | 3/2005 | Jeddeloh | |
| 2005/0050255 A1 | 3/2005 | Jeddeloh | |
| 2005/0066136 A1 | 3/2005 | Schnepper | |
| 2005/0071542 A1 | 3/2005 | Weber et al. | |
| 2005/0080581 A1 | 4/2005 | Zimmerman et al. | |
| 2005/0086441 A1 | 4/2005 | Myer et al. | |
| 2005/0097249 A1 | 5/2005 | Oberlin et al. | |
| 2005/0120157 A1 | 6/2005 | Chen et al. | 710/313 |
| 2005/0125702 A1 | 6/2005 | Huang et al. | |
| 2005/0125703 A1 | 6/2005 | Lefurgy et al | |
| 2005/0138246 A1 | 6/2005 | Chen et al. | |
| 2005/0138267 A1 | 6/2005 | Bains et al. | |
| 2005/0144399 A1 | 6/2005 | Hosomi | |
| 2005/0149665 A1 | 7/2005 | Wolrich et al. | |
| 2005/0166006 A1 | 7/2005 | Talbot et al. | |
| 2005/0177677 A1 | 8/2005 | Jeddeloh | |
| 2005/0177690 A1 | 8/2005 | LaBerge | |
| 2005/0204216 A1 | 9/2005 | Daily et al. | 714/724 |
| 2005/0223196 A1 | 10/2005 | Knowles | |
| 2005/0229132 A1 | 10/2005 | Butt et al. | 716/10 |
| 2005/0248997 A1* | 11/2005 | Lee | 365/194 |
| 2005/0257005 A1 | 11/2005 | Jeddeloh | |
| 2005/0259496 A1 | 11/2005 | Hsu et al. | |
| 2005/0289377 A1 | 12/2005 | Luong | |
| 2006/0036826 A1 | 2/2006 | Dell et al. | |
| 2006/0036827 A1 | 2/2006 | Dell et al. | |
| 2006/0080584 A1 | 4/2006 | Hartnett et al. | |
| 2006/0085602 A1 | 4/2006 | Huggahalli et al. | |
| 2006/0095592 A1 | 5/2006 | Borkenhagen | |
| 2006/0095679 A1 | 5/2006 | Edirisooriya | |
| 2006/0107175 A1 | 5/2006 | Dell et al. | |
| 2006/0161733 A1 | 7/2006 | Beckett et al. | |
| 2006/0195631 A1 | 8/2006 | Rajamani | |
| 2006/0288172 A1 | 12/2006 | Lee et al. | |
| 2007/0025304 A1 | 2/2007 | Leelahakriengkrai et al. | |
| 2007/0160053 A1 | 7/2007 | Coteus | |

FOREIGN PATENT DOCUMENTS

| | | | |
|---|---|---|---|
| GB | 2396711 A | | 6/2004 |
| JP | 59153353 A | * | 9/1984 |
| JP | 04326140 A | | 11/1992 |
| JP | 10011971 | * | 1/1998 |
| WO | WO2005038660 | | 4/2005 |

OTHER PUBLICATIONS

Jungjoon Kim et al.; "Performance and Architecture Features of Segmented Multiple Bus System;" IEEE Computer Society; 1999 International Conference on Parallel Processing (ICPP '99).

Ghoneima et al.; "Optimum Positioning of Interleaved Reapeaters in Bidirectional Buses," IEEE Transactions on Computer-Aided Design of Integrated Circuits and Systems, vol. 25, No. 3, Mar. 2005, pp. 461-469.

Seceleanu et al.; "Segment Arbiter as Action System;" IEEE 2003 pp. 249-252.

Understanding System Memory and CPU Speeds: A Layman's Guide to the Front Side Bus (FSB), [online]; [retrieved on Feb. 23, 2006]; retrieved from the Internet http://www.directron.com/fsbguide.html.

JEDEC Solid State Technology Association, "JEDEC Standard: DDR2 SDRAM Specification", Jan. 2004, JEDEC, Revision JESD79-2A, p. 10.

Brown, et al "Compiler-Based I/O Prefetching for Out-of-Core Applications", ACM Transactions on Computer Systems, vol. 19, No. 2, May 2001, pp. 111-170.

Wang, et al "Guided Region Prefetching: A Cooperative Hardware/Software Approach", pp. 388-398.

Natarajan, et al "A Study of Performance Impact of Memory Controller Features in Multi-Processor Server Environment", pp. 80-87.

Nilsen, "High-Level Dynamic Memory Management for Object-Oriented Real-Time Systems", pp. 86-93.

Benini, Luca, et al. "System-Level Power Optimization: Techniques and Tools", ACM Transactions on Design Automation of Electronic Systems, vol. 6, No. 2, Apr. 2001, pp. 149-206.

Boudon, et al., "Novel Bus Reconfiguration Scheme With Spare Lines", IBM Technical Disclosure Bulletin, May 1987, vol. 29, No. 12, pp. 1-3.

Massoud Pedram, "Power Minimization in IC Design Principles and Applications", ACM Transactions on Design Automation of Electronic Systems vol. 1, No. 1, Jan. 1996, pp. 3-56.

P.R. Panda, "Data and Memory Optimization Techniques For Embedded Systems", ACM Transactions on Design Automation of Electronic Systems, vol. 6, No. 2, Apr. 2001, pp. 149-206.

Penrod, Lee, "Understanding System Memory and CPU Speeds: A laymans guide to the Front Side Bus (FSB)", Dec. 28, 2005, Direction. Org, pp. 1-5, http://www.directron.com/directron/fsbguide.html.

Singh, S., et al., "Bus Sparing for Fault-Tolerant System Design", IBM Technical Disclosure Bulletin, Dec. 1991, vol. 34, No. 71, pp. 117-118.

U.S. Appl. No. 11/419,586, filed May 22, 2006. Robert Tremaine. "Systems and Methods for Providing Remote Pre-Fetch Buffers".

NB940259 (IBM Technical Disclosure Bulletin, Feb. 1994; vol. 37; pp. 59-64).

Wikipedia, Serial Communications, [online], [retrieved Apr. 10, 2007 from the Internet], http://en.wikipedia.org/wiki/Serial_communications, 3 pages.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommuications", Second Edition, John Wiley & Sons, Inc. 1987. 3 pgs.

PCT Search Report. PCT/EP2007/057915 Mailed Nov. 7, 2007.
PCT International Search Report PCT/EP2006/068984. Mailed Feb. 16, 2007.
PCT International Search Report PCT/EP2007/057916. Mailed Dec. 14, 2007.

International Search Report, International Application No. PCT/EP2007/054929, International Publication No. WO 2007/135144 A1, received Mar. 21, 2008.

* cited by examiner

TYPICAL LARGE-SYSTEM MEMORY CONFIGURATION

SYSTEM, METHOD AND STORAGE MEDIUM FOR A MEMORY SUBSYSTEM WITH POSITIONAL READ DATA LATENCY

BACKGROUND OF THE INVENTION

The invention relates to a memory subsystem and in particular, to a memory subsystem with positional read data latency.

Computer memory subsystems have evolved over the years, but continue to retain many consistent attributes. Computer memory subsystems from the early 1980's, such as the one disclosed in U.S. Pat. No. 4,475,194 to LaVallee et al., of common assignment herewith, included a memory controller, a memory assembly (contemporarily called a basic storage module (BSM) by the inventors) with array devices, buffers, terminators and ancillary timing and control functions, as well as several point-to-point busses to permit each memory assembly to communicate with the memory controller via its own point-to-point address and data bus. FIG. 1 depicts an example of this early 1980 computer memory subsystem with two BSMs, a memory controller, a maintenance console, and point-to-point address and data busses connecting the BSMs and the memory controller.

FIG. 2, from U.S. Pat. No. 5,513,135 to Dell et al., of common assignment herewith, depicts an early synchronous memory module, which includes synchronous dynamic random access memories (DRAMs) 8, buffer devices 12, an optimized pinout, an interconnect and a capacitive decoupling method to facilitate operation. The patent also describes the use of clock re-drive on the module, using such devices as phase lock loops (PLLs).

FIG. 3, from U.S. Pat. No. 6,510,100 to Grundon et al., of common assignment herewith, depicts a simplified diagram and description of a memory system 10 that includes up to four registered dual inline memory modules (DIMMs) 40 on a traditional multi-drop stub bus channel. The subsystem includes a memory controller 20, an external clock buffer 30, registered DIMMs 40, an address bus 50, a control bus 60 and a data bus 70 with terminators 95 on the address bus 50 and data bus 70.

FIG. 4 depicts a 1990's memory subsystem which evolved from the structure in FIG. 1 and includes a memory controller 402, one or more high speed point-to-point channels 404, each connected to a bus-to-bus converter chip 406, and each having a synchronous memory interface 408 that enables connection to one or more registered DIMMs 410. In this implementation, the high speed, point-to-point channel 404 operated at twice the DRAM data rate, allowing the bus-to-bus converter chip 406 to operate one or two registered DIMM memory channels at the full DRAM data rate. Each registered DIMM included a PLL, registers, DRAMs, an electrically erasable programmable read-only memory (EEPROM) and terminators, in addition to other passive components.

As shown in FIG. 5, memory subsystems were often constructed with a memory controller connected either to a single memory module, or to two or more memory modules interconnected on a 'stub' bus. FIG. 5 is a simplified example of a multi-drop stub bus memory structure, similar to the one shown in FIG. 3. This structure offers a reasonable tradeoff between cost, performance, reliability and upgrade capability, but has inherent limits on the number of modules that may be attached to the stub bus. The limit on the number of modules that may be attached to the stub bus is directly related to the data rate of the information transferred over the bus. As data rates increase, the number and length of the stubs must be reduced to ensure robust memory operation. Increasing the speed of the bus generally results in a reduction in modules on the bus, with the optimal electrical interface being one in which a single module is directly connected to a single controller, or a point-to-point interface with few, if any, stubs that will result in reflections and impedance discontinuities. As most memory modules are sixty-four or seventy-two bits in data width, this structure also requires a large number of pins to transfer address, command, and data. One hundred and twenty pins are identified in FIG. 5 as being a representative pincount.

FIG. 6, from U.S. Pat. No. 4,723,120 to Petty, of common assignment herewith, is related to the application of a daisy chain structure in a multipoint communication structure that would otherwise require multiple ports, each connected via point-to-point interfaces to separate devices. By adopting a daisy chain structure, the controlling station can be produced with fewer ports (or channels), and each device on the channel can utilize standard upstream and downstream protocols, independent of their location in the daisy chain structure.

FIG. 7 represents a daisy chained memory bus, implemented consistent with the teachings in U.S. Pat. No. 4,723,120. A memory controller 111 is connected to a memory bus 315, which further connects to a module 310a. The information on bus 315 is re-driven by the buffer on module 310a to the next module, 310b, which further re-drives the bus 315 to module positions denoted as 310n. Each module 310a includes a DRAM 311a and a buffer 320a. The bus 315 may be described as having a daisy chain structure with each bus being point-to-point in nature.

One drawback to the use of a daisy chain bus is associated with the return of read data from a series of daisy chained memory modules. As each of the modules in the channel has a different number of intervening stages to return its read data through on its way to the memory controller, modules may have different minimum read data latencies associated with them. Variations in read data return times may be difficult for the memory controller to manage and could result in undue logic complexity. One option for simplifying this situation is to make the read data latency of modules closer to the memory controller in the channel equal to the latency of the module that is furthest away from the memory controller in the channel. Leveling the read data latency in this manner can be achieved by adding a fixed amount of delay to the return of read data based on its location in the daisy chain. In this way, the memory controller will receive all read data with the same latency from the requesting command, regardless of the position within the channel of the addressed module. A major drawback with this approach is that the read data latency is a critical metric of main memory performance. Setting the read data latency of all modules in the daisy chain to be equal to the worst latency results in higher delays incurred, while accessing data from the memory subsystem and therefore decreases system performance.

BRIEF SUMMARY OF THE INVENTION

Exemplary embodiments of the present invention include a memory subsystem with positional read data latency. The memory subsystem includes a cascaded interconnect system with one or more memory modules, a memory controller and one or more memory busses. The memory controller includes instructions for providing positional read data latency. The memory modules and the memory controller are interconnected by a packetized multi-transfer interface via the memory busses.

Additional exemplary embodiments include a method for positional read data latency in a cascaded interconnect memory subsystem. The method includes receiving a read request for a target memory module. An additional read data latency time period is calculated for the read request. A read command including the additional read data latency time period and the read request is transmitted to the target memory module. Data from the target memory module responsive to the read command is received at a memory controller, where the target memory module has transmitted the data to the memory controller after the additional read data latency time period has expired.

Further exemplary embodiments include a storage medium with machine readable computer program code for providing positional read data latency in a cascaded interconnect memory subsystem. The storage medium includes instructions for causing a computer to implement a method. The method includes receiving a read request for a target memory module. An additional read data latency time period is calculated for the read request. A read command including the additional read data latency time period and the read request is transmitted to the target memory module. Data from the target memory module responsive to the read command is received at a memory controller, where the target memory module has transmitted the data to the memory controller after the additional read data latency time period has expired.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments of the present invention provide circuits and methods that enable positional read data latency for a memory channel comprised of cascaded, buffered memory modules. The use of positional read data latency for a memory channel (also referred to herein as a memory subsystem) may lead to increased memory channel performance. Exemplary embodiments of the present invention provide positional read data latency without adding undue complexity to the memory controller or to the device logic associated with the buffered memory modules.

In an exemplary embodiment of the present invention, positional read data latency is provided by a high speed and high reliability memory subsystem architecture and interconnect structure that includes single-ended point-to-point interconnections between any two subsystem components. An alternate exemplary embodiment of the present invention utilizes differential interconnections between any two subsystem components. The memory subsystem further includes a memory control function, one or more memory modules, one or more high speed busses operating at an integer (such as four to one) speed ratio relative to a DRAM data rate and a bus-to-bus converter chip on each of one or more cascaded modules to convert the high speed bus(ses) into the conventional double data rate (DDR) memory interface. The memory modules operate as slave devices to the memory controller, responding to commands in a deterministic or non-deterministic manner, but do not self-initiate unplanned bus activity, except in cases where operational errors are reported in a real-time manner. Memory modules can be added to the cascaded bus with each module assigned an address to permit unique selection of each module on the cascaded bus. Exemplary embodiments of the present invention include a packetized multi-transfer interface which utilizes an innovative communication protocol to permit memory operation to occur on a reduced pincount, whereby address, command and data is transferred between the components on the cascaded bus over multiple cycles, and are reconstructed and errors corrected prior to being used by the intended recipient.

Figure 1:
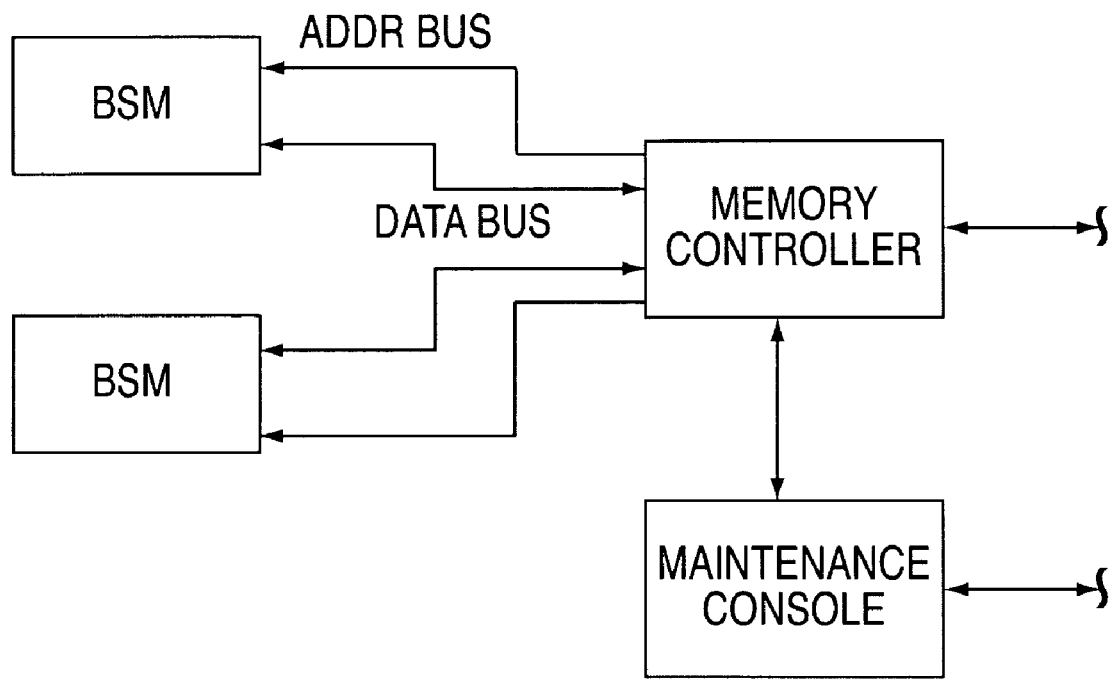
FIG. 1 depicts a prior art memory controller connected to two buffered memory assemblies via separate point-to-point links.
Figure 2:
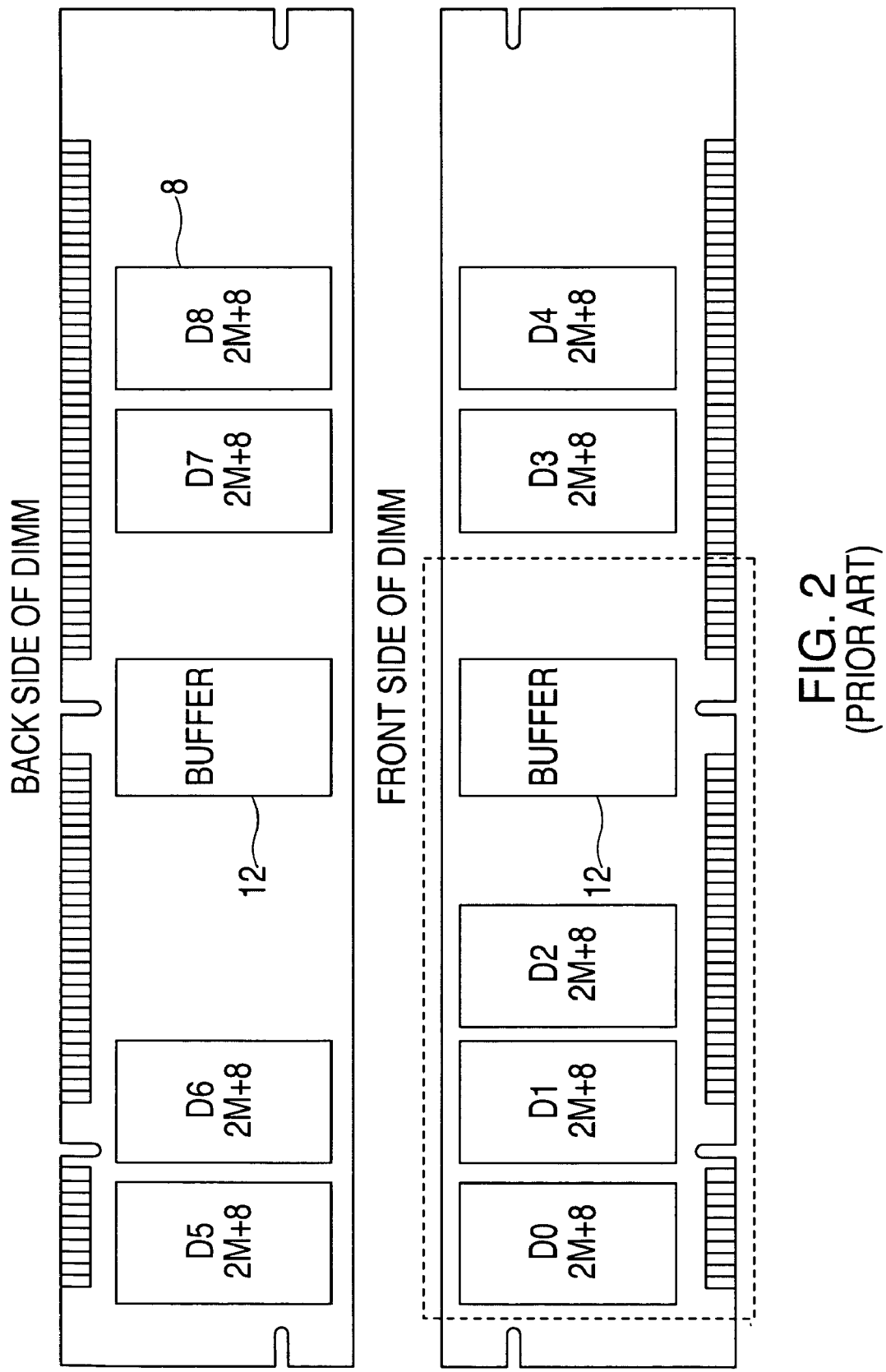
FIG. 2 depicts a prior art synchronous memory module with a buffer device.
Figure 3:
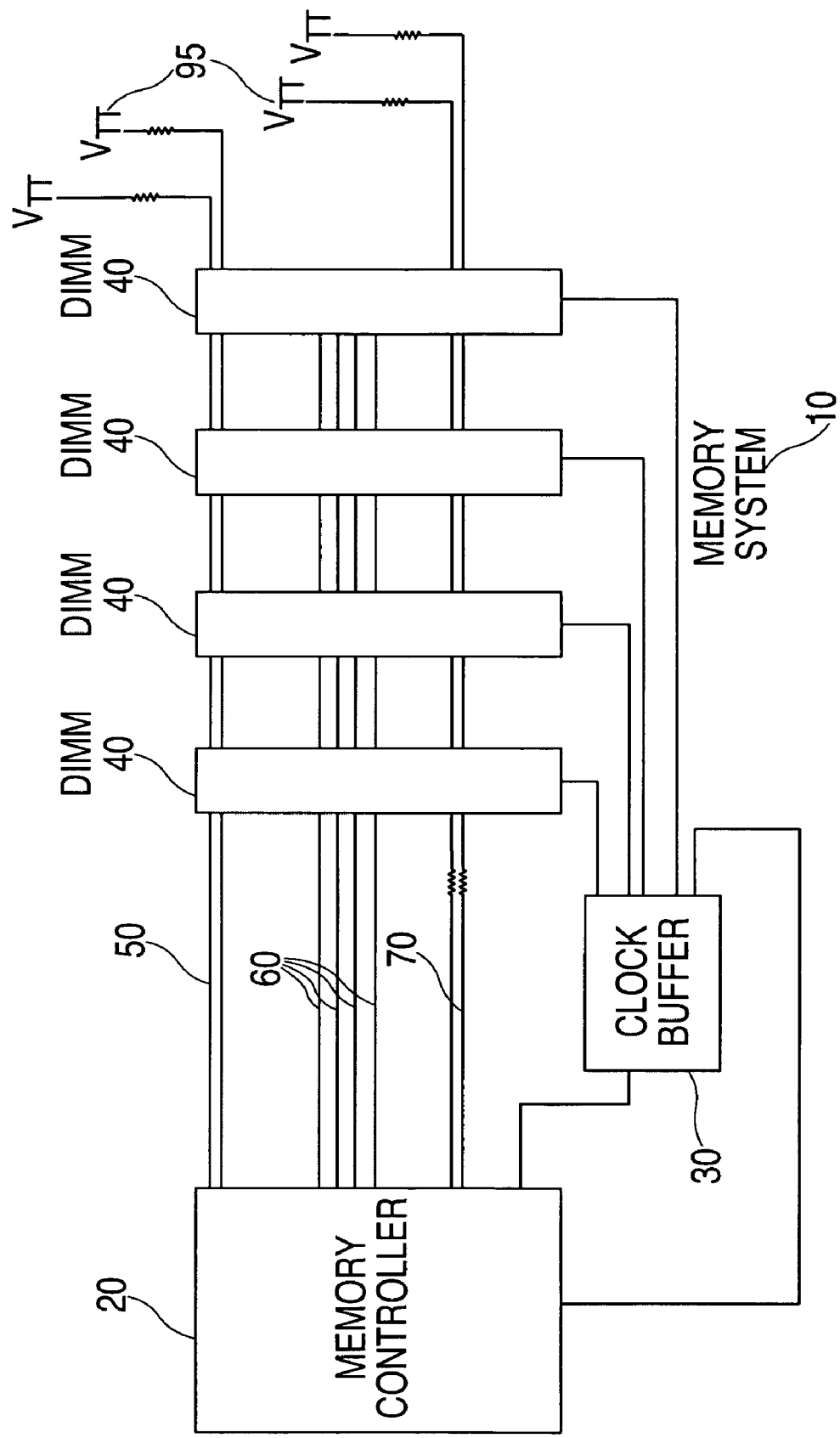
FIG. 3 depicts a prior art memory subsystem using registered DIMMs.
Figure 4:
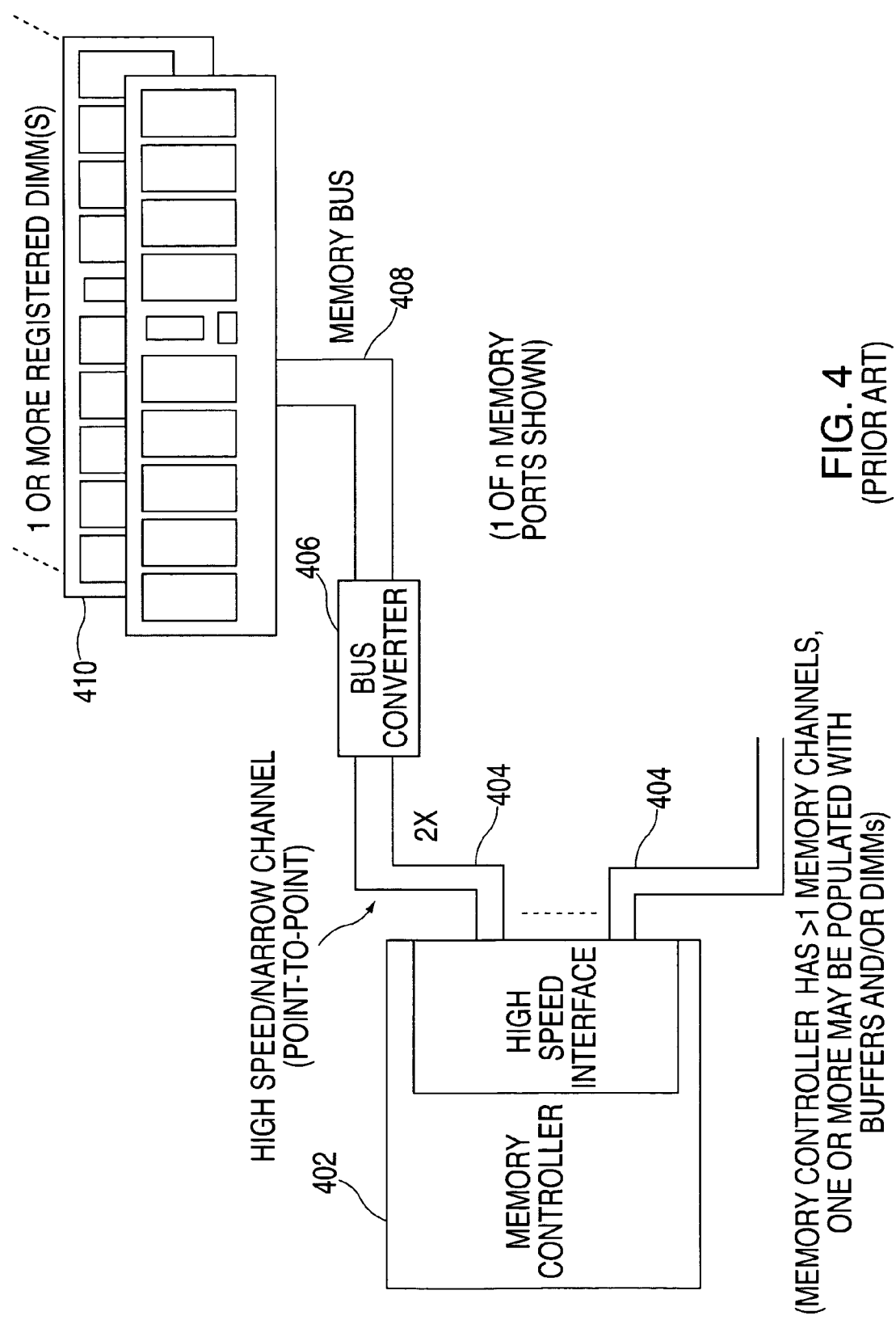
FIG. 4 depicts a prior art memory subsystem with point-to-point channels, registered DIMMs, and a 2:1 bus speed multiplier.
Figure 5:
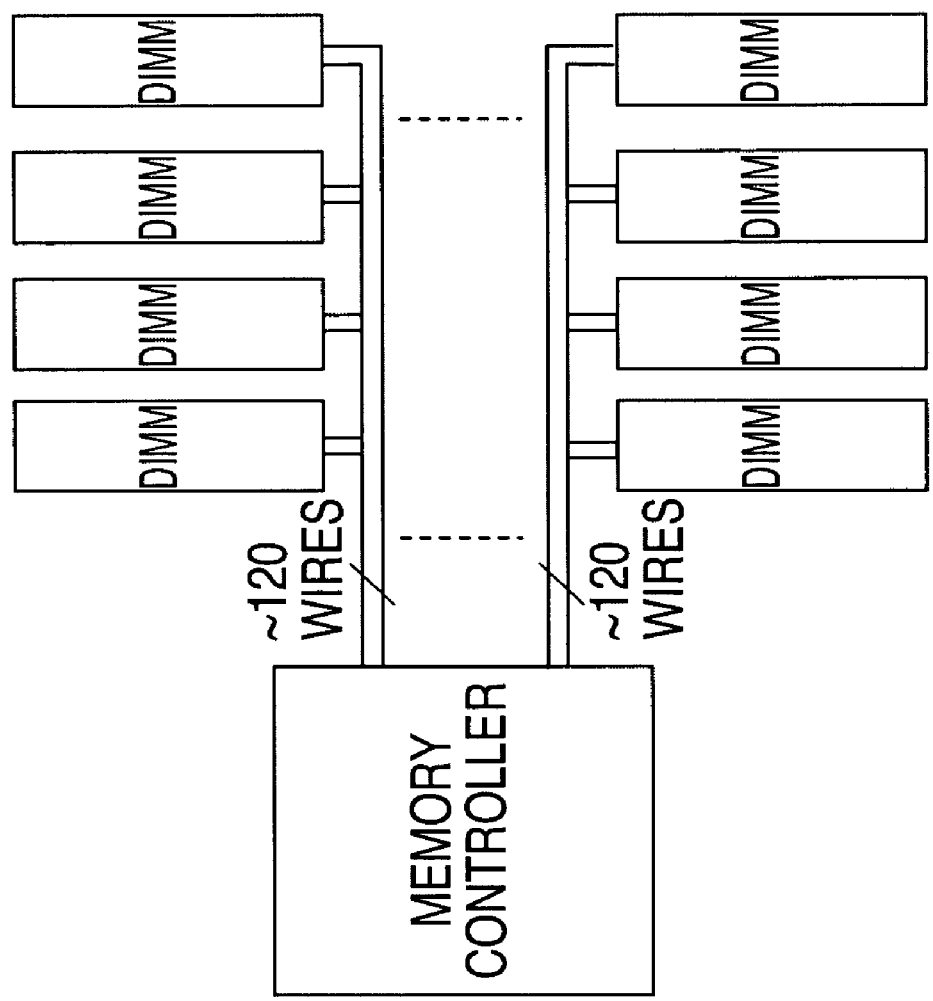
FIG. 5 depicts a prior art memory structure that utilizes a multidrop memory 'stub' bus.
Figure 6:
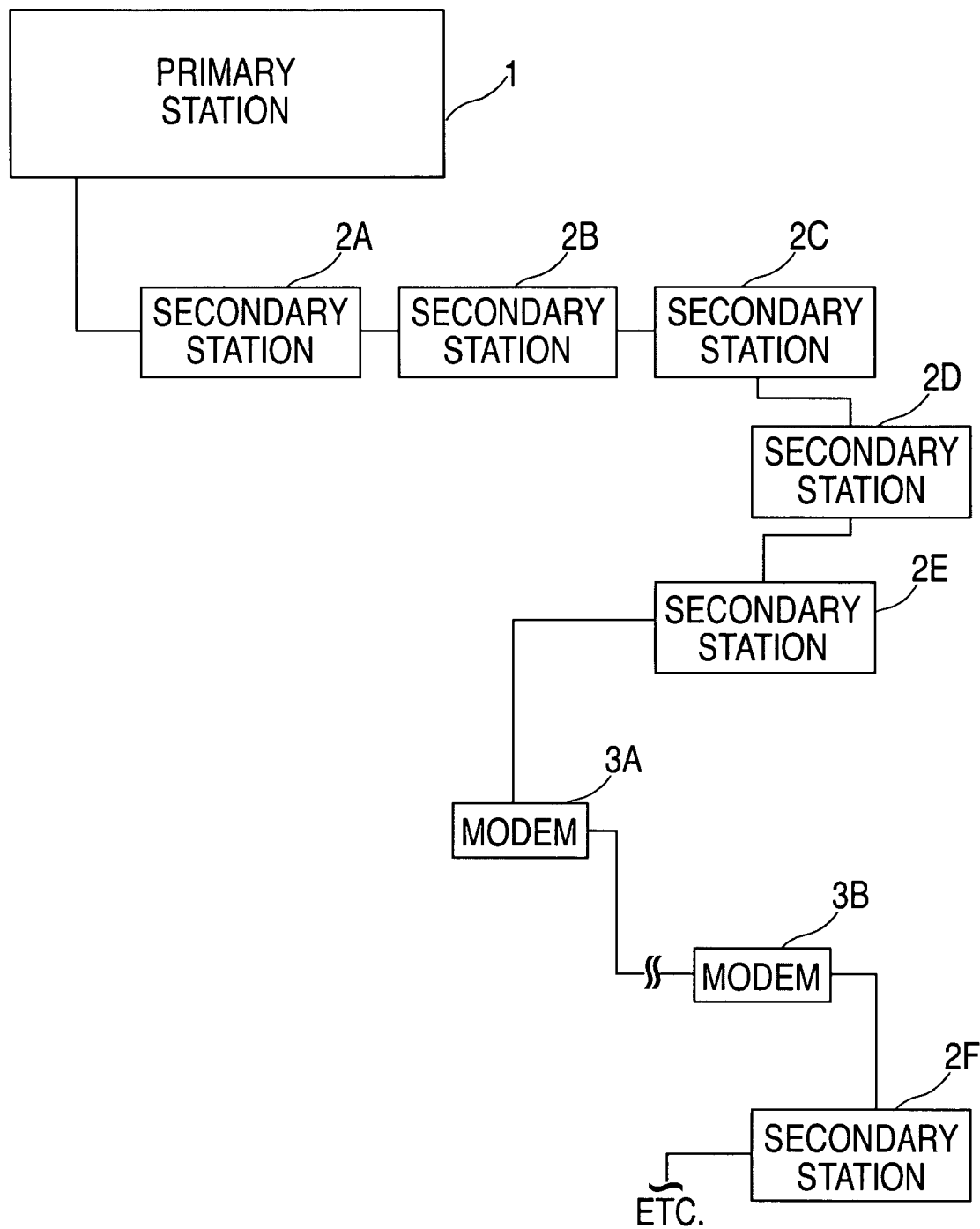
FIG. 6 depicts a prior art daisy chain structure in a multi-point communication structure that would otherwise require multiple ports.
Figure 7:
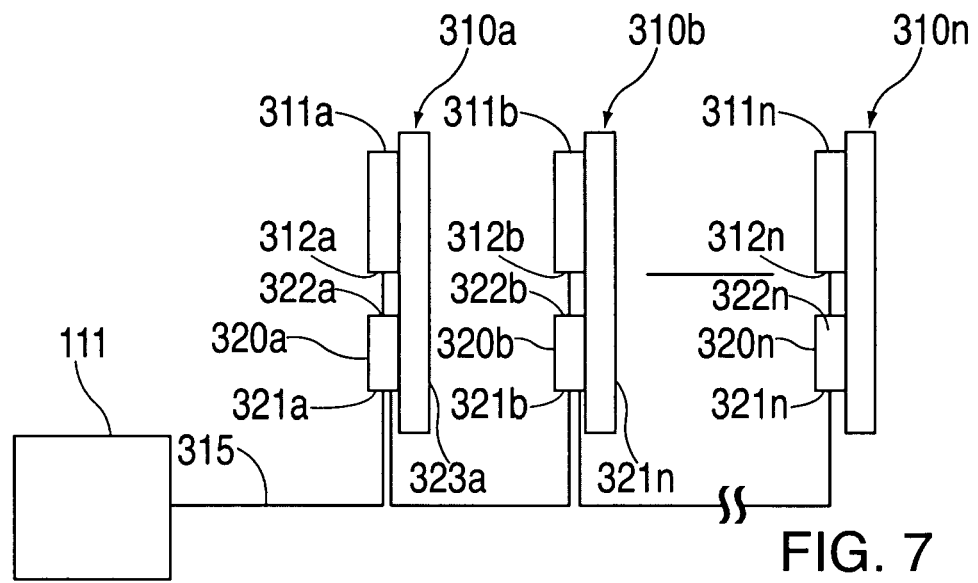
FIG. 7 depicts a prior art daisy chain connection between a memory controller and memory modules.
Figure 8:
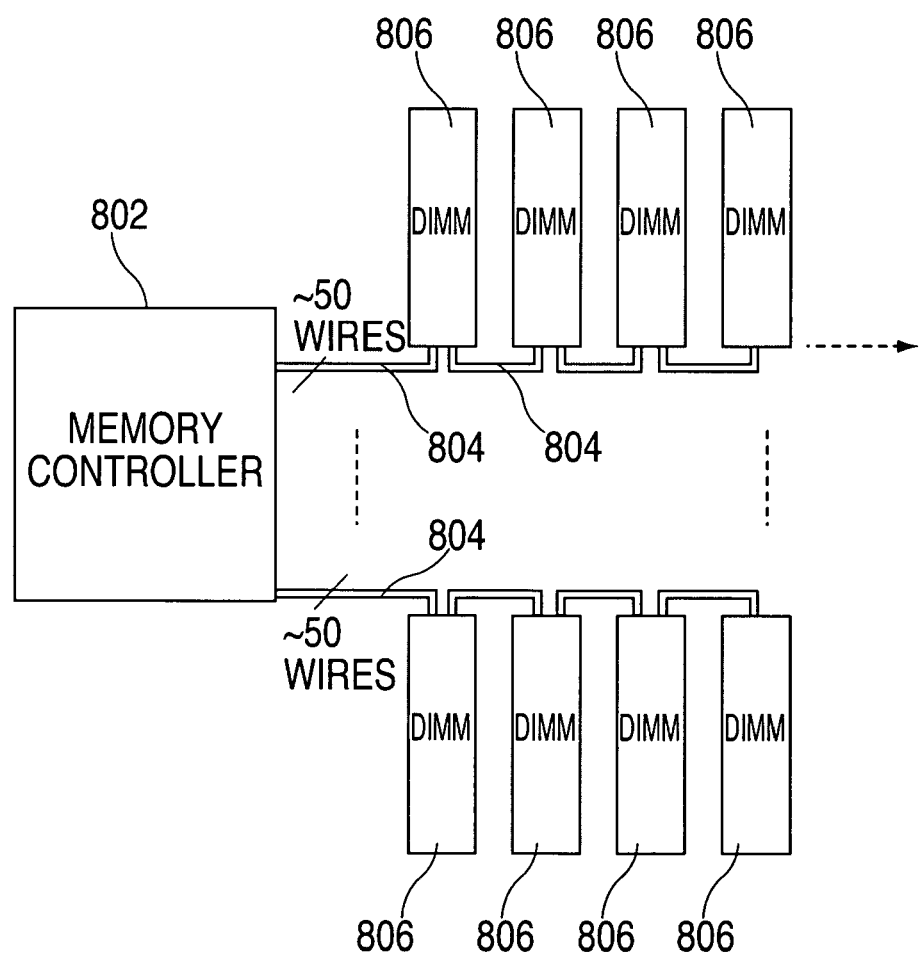
FIG. 8 depicts a cascaded memory structure that is utilized by exemplary embodiments of the present invention.

FIG. 8 depicts a cascaded memory structure that may be utilized by exemplary embodiments of the present invention. This memory structure includes a memory controller 802 in communication with one or more memory modules 806 via a high speed point-to-point bus 804. Each bus 804 in the exemplary embodiment depicted in FIG. 8 includes approximately fifty high speed wires for the transfer of address, command, data and clocks. By using point-to-point busses as described in the aforementioned prior art, it is possible to optimize the bus design to permit significantly increased data rates, as well as to reduce the bus pincount by transferring data over multiple cycles. Whereas FIG. 4 depicts a memory subsystem with a two to one ratio between the data rate on any one of the busses connecting the memory controller to one of the bus converters (e.g., to 1,066 Mb/s per pin) versus any one of the busses between the bus converter and one or more memory modules (e.g., to 533 Mb/s per pin), an exemplary embodiment of the present invention, as depicted in FIG. 8, provides a four to one bus speed ratio to maximize bus efficiency and to minimize pincount.

Although point-to-point interconnects permit higher data rates, overall memory subsystem efficiency must be achieved by maintaining a reasonable number of memory modules 806 and memory devices per channel (historically four memory modules with four to thirty-six chips per memory module, but as high as eight memory modules per channel and as few as one memory module per channel). Using a point-to-point bus necessitates a bus re-drive function on each memory module. The re-drive function permits memory modules to be cascaded such that each memory module is interconnected to other memory modules, as well as to the memory controller 802.

Figure 9:
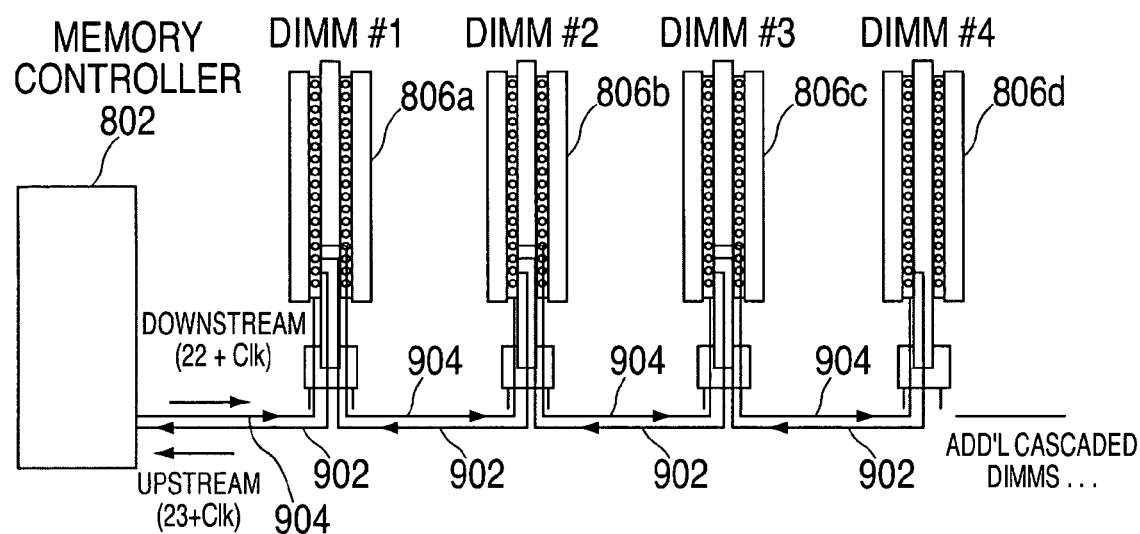
FIG. 9 depicts a memory structure with cascaded memory modules and unidirectional busses that is utilized by exemplary embodiments of the present invention.

FIG. 9 depicts a memory structure with cascaded memory modules and unidirectional busses that is utilized by exemplary embodiments of the present invention. One of the functions provided by the memory modules 806 in the cascade structure is a re-drive function to send signals on the memory bus to other memory modules 806 or to the memory controller 802. FIG. 9 includes the memory controller 802 and four memory modules 806a, 806b, 806c and 806d, on each of two memory busses (a downstream memory bus 904 and an upstream memory bus 902), connected to the memory controller 802 in either a direct or cascaded manner. Memory module 806a is connected to the memory controller 802 in a direct manner. Memory modules 806b, 806c and 806d are connected to the memory controller 802 in a cascaded manner.

An exemplary embodiment of the present invention includes two unidirectional busses between the memory controller 802 and memory module 806a ("DIMM #1"), as well as between each successive memory module 806b-d ("DIMM #2", "DIMM #3" and "DIMM #4") in the cascaded memory structure. The downstream memory bus 904 is comprised of twenty-two single-ended signals and a differential clock pair. The downstream memory bus 904 is used to transfer address, control, write data and bus-level error code correction (ECC) bits downstream from the memory controller 802, over several clock cycles, to one or more of the memory modules 806 installed on the cascaded memory channel. The upstream memory bus 902 is comprised of twenty-three single-ended signals and a differential clock pair, and is used to transfer read data and bus-level ECC bits upstream from the sourcing memory module 806 to the memory controller 802. Using this memory structure, and a four to one data rate multiplier between the DRAM data rate (e.g., 400 to 800 Mb/s per pin) and the unidirectional memory bus data rate (e.g., 1.6 to 3.2 Gb/s per pin), the memory controller 802 signal pincount, per memory channel, is reduced from approximately one hundred and twenty pins to about fifty pins.

Figure 10:
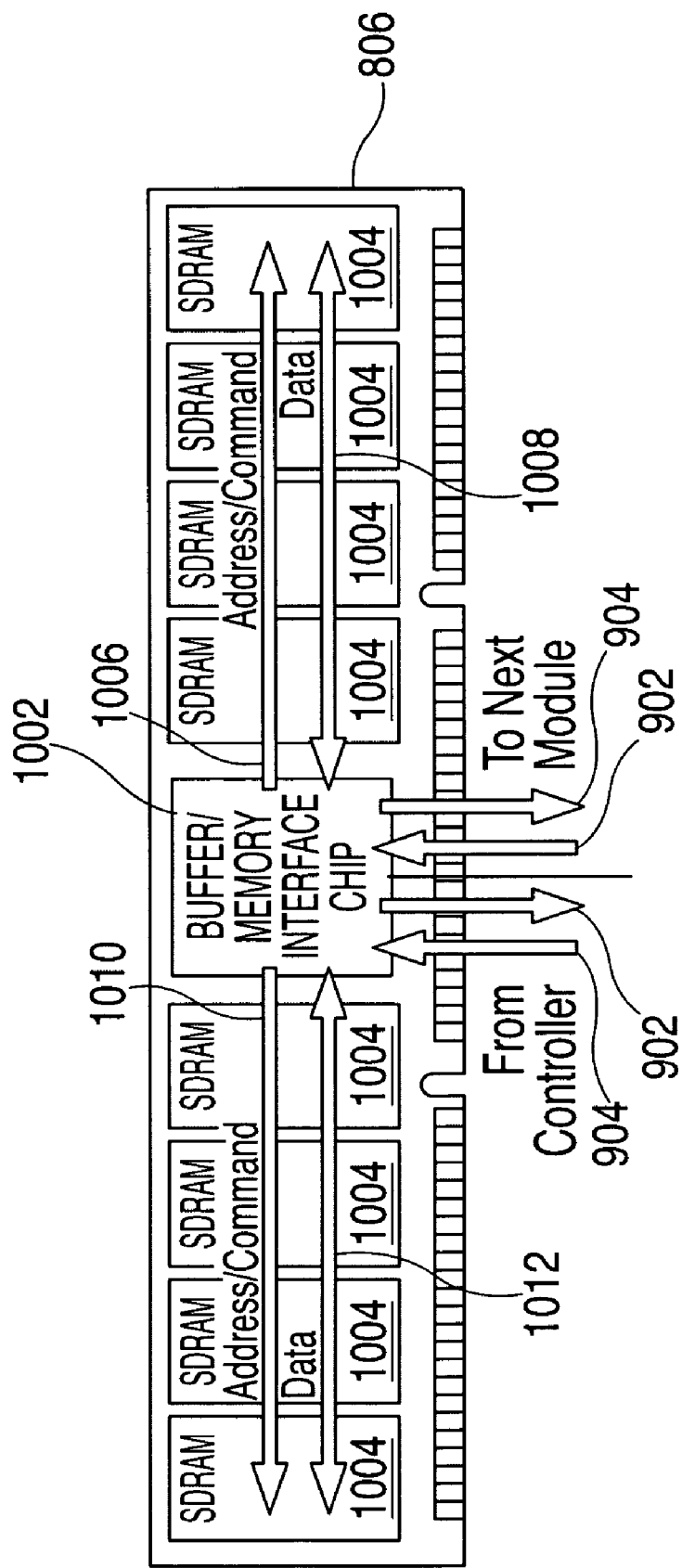
FIG. 10 depicts a buffered module wiring system that is utilized by exemplary embodiments of the present invention.

FIG. 10 depicts a buffered module wiring system that is utilized by exemplary embodiments of the present invention. FIG. 10 is a pictorial representation of a memory module with shaded arrows representing the primary signal flows. The signal flows include the upstream memory bus 902, the downstream memory bus 904, memory device address and command busses 1010 and 1006, and memory device data busses 1012 and 1008. In an exemplary embodiment of the present invention, the buffer device 1002, also referred to as a memory interface chip, provides two copies of the address and command signals to memory devices 1004 (e.g., synchronous DRAMs (SDRAMS)) with the right memory device address and command bus 1006 exiting from the right side of the buffer device 1002 for the memory devices 1004 located to the right side and behind the buffer device 1002 on the right. The left memory device address and command bus 1010 exits from the left side of the buffer device 1002 and connects to the memory devices 1004 to the left side and behind the buffer device 1002 on the left. Similarly, the data bits intended for memory devices 1004 to the right of the buffer device 1002 exit from the right of the buffer module 1002 on the right memory device data bus 1008. The data bits intended for the left side of the buffer device 1002 exit from the left of the buffer device 1002 on the left memory device data bus 1012. The high speed upstream memory bus 902 and downstream memory bus 904 exit from the lower portion of the buffer device 1002, and connect to a memory controller or other memory modules either upstream or downstream of this memory module 806, depending on the application. The buffer device 1002 receives signals that are four times the memory module data rate and converts them into signals at the memory module data rate.

The memory controller 802 interfaces to the memory modules 806 via a pair of high speed busses (or channels). The downstream memory bus 904 (outbound from the memory controller 802) interface has twenty-four pins and the upstream memory bus 902 (inbound to the memory controller 802) interface has twenty-five pins. The high speed channels each include a clock pair (differential), a spare bit lane, ECC syndrome bits and the remainder of the bits pass information (based on the operation underway). Due to the cascaded memory structure, all nets are point-to-point, allowing reliable high-speed communication that is independent of the number of memory modules 806 installed. Whenever a memory module 806 receives a packet on either bus, it re-synchronizes the command to the internal clock and re-drives the command to the next memory module 806 in the chain (if one exists).

In order to provide positional read data latency, the memory modules 806 include read data registers with a plurality of latches to contain read data from a plurality of read commands. The read data registers (also referred to herein as read data buffers) are arranged in a first-in-first-out (FIFO) organization such that read data will always be returned in the order in which it was requested. Each read command from the memory controller 802 to the memory module 806 includes a field of information that specifies how much additional time read data should reside in the read buffers before being sent to the memory controller 802 on the upstream memory bus 902. This additional time is referred to herein as the delay period, or the read data buffer delay (RDBD). The outstanding read latency of a memory channel is the current amount of time required to return to the last transfer of previously requested read data. The memory controller 802 uses pre-configured minimum latency information, along with counters to keep track of the current outstanding read latency of the channel, to issue read commands with RDBD values that return data on an easily predicted clock cycle and that prevent collisions between frames of returned read data on the upstream controller interface.

Figure 11:
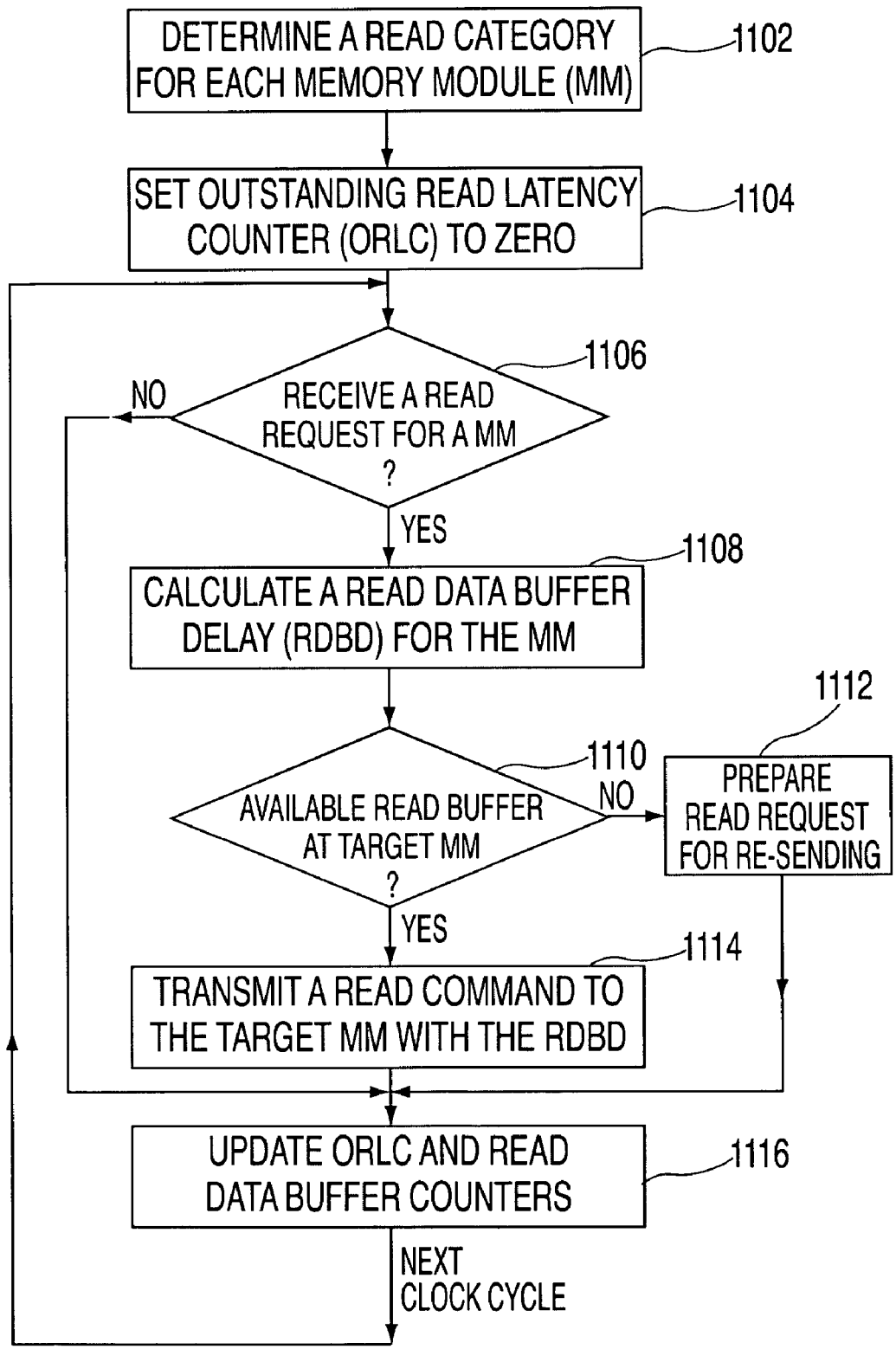
FIG. 11 depicts a process flow for providing positional read data latency in accordance with an exemplary embodiment of the present invention.

FIG. 11 depicts a process flow for providing positional read data latency in accordance with an exemplary embodiment of the present invention. At 1102, a minimum read data latency is determined for each memory module 806 within the memory subsystem. The minimum read data latency, or round trip delay times, for each memory module 806 may be pre-determined by system timing analysis. A small set of configuration registers contain the total read data latency for accesses to each set of memory modules 806 across all of the channels within a logical memory port. This value will indicate the return cycle of the first data shot in a read data burst. In general, memory modules 806, across multiple memory subsystems of the same rank will have the same read data latency. So, a memory controller with four memory modules per memory channel within a logical memory port would be configured for a total of four read data latency values, one for each of the daisy chained memory module slots within a channel.

At block 1104, an outstanding read latency counter (ORLC) is initialized by being set to zero. The ORLC is a counter that is used by the memory controller 802 logic to keep track of the remaining latency of the latest outstanding read operation, including all transfers of data within a burst.

The processing shown in blocks 1106 through 1116 is performed once per clock cycle, while the memory subsystem is processing data. At block 1106, it is determined if a read request for a target memory module 806 was received in the new clock cycle. If it is determined at block 1106 that a read request was not received, then processing continues at block 1116. If it is determined that a read request was received, then block 1108 is performed.

At block 1108, a read data buffer delay (RDBD) (i.e., an additional delay period, also referred to herein as an additional read data latency time period) for the target memory module is calculated. Each read command will have an associated RDBD value that may be zero if conditions allow. This value is chosen to return all data to the memory controller 802 in the order in which it is requested and to prevent collisions on the read data return busses (i.e., the upstream memory bus 902). The smallest (optimal) allowed value is easily determined by subtracting the read latency configuration for the addressed, or target, memory module 806 from the current ORLC and adding one. Using the RDBD values from this formula with multiple read commands results in the back to back return of read data with no collisions. Read commands issued to an idle memory port, or memory channel, will always add zero RDBD so that data will be returned as quickly as possible. An exemplary formula for calculating a RDBD for a target memory module 806 follows:

$$RDBD_{target\_memory\_module} = MAX(ORLC_{current} - read\_latency_{target\_memory\_module} + 1, 0).$$

At block 1110, a check is made to determine if the target memory module 806 has an available read buffer. In order to issue a new read command with a RBD value greater than zero, the memory controller 802 must ensure that the addressed memory bank is available and that there is an open read buffer within the addressed, or target, memory module 806.

In an exemplary embodiment of the present invention, this check is performed by using read buffer counters for each memory module 806 within a memory subsystem. As read commands are issued and returned to each memory module 806, the counters are modified to track the buffer usage. One problem with this approach is that an over pessimistic read buffer usage prediction may result. Read operations may be held off when, in fact, it may be allowable for them to be initiated.

Due to the FIFO nature of the read buffers, the read buffers may be utilized more efficiently by scheduling the time that the read data is actually buffered. In an alternate exemplary embodiment of the present invention, a small number of read buffers are utilized by using a simple but more advanced algorithm in order to determine if the target memory module 806 has an available read buffer. Instead of using one read buffer counter per memory module 806 that tracks buffer occupancy, the memory controller 802 uses one read buffer counter per read buffer per memory module 806. For a memory channel, or memory subsystem, with four memory modules 806 each with two read buffers, this would require a total of eight small read buffer counters.

On memory clock cycles in which a read command is not issued to a given read buffer, the read buffer counter of the given read buffer is decremented by eight (the number of bits transferred per clock cycle) with a minimum of zero. In order to issue a read command to a memory module 806, the memory controller 802 checks, at block 1110, to see that at least one of the read buffer counters associated with the addressed memory module 806 has a value of zero. On memory clock cycles in which a read command is issued, one of the read buffer counters of the target memory module 806 that is currently at zero will be loaded with the RDBD value determined at block 1108. Using this technique, there can be more memory read operations outstanding per memory module 806 than there are read data buffers per memory module 806. If none of the read buffer counters associated with the target memory module 806 are equal to zero (i.e., it is determined at block 1110 that there are no available read buffers at the target memory module 806), then block 1112 is performed to prepare the read request for re-sending during another clock cycle. For example, the one memory controller logic may reject the requested read operation, indicating that the requesting unit must retry it at a later time. Once block 1112 has completed, processing continues at block 1116.

At block 1114, a read command that includes the RDBD (i.e., the additional delay) is issued to the target memory module 806. The value of the RDBD is placed in a read buffer counter associated with the target memory module 806.

At block 1116, the ORLC is updated and read data buffer counters are updated. The ORLC is updated to be equal to the read latency for the addressed memory module 806 plus the width of the read data burst plus the added RDBD minus one. This updated, or new, ORLC indicates the return of the last transfer of data from the new read data command and may also be utilized to predict the arrival of the first transfer in the memory controller read data capture and bus error code correction (ECC) logic. On memory clock cycles in which a new read command is not issued, the ORLC will be decremented by eight (but never below zero) as there will be eight bit times per memory clock cycle. Following is an exemplary formula for calculating the new value of the ORLC:

$$ORLC_{new} = MAX(ORLC_{current} - 8, 0) \text{ when new\_read\_command="0" ELSE}$$

$$ORLC_{new} = read\_latency_{target\_memory\_module} + (4 \times burst\_length) + RDBD_{target\_memory\_module} - 1.$$

Following is an exemplary formula for calculating the new read buffer counters when there are two read buffers per memory module 806 and four memory modules 806 in the memory subsystem:

$$read\_buffer\_counter[0 \ldots 7]_{new} = MAX(read\_buffer\_counter[0 \ldots 7]_{current} - 8), 0) \text{ WHEN new\_read\_command="0" ELSE}$$

$$read\_buffer\_counter[target\_memory\text{-}module]_{new} = RDBD_{target\_memory\_module}.$$

After block 1116 is completed, processing continues during the next clock cycle at block 1106. Processing continues in this fashion from blocks 1106 through 1116, while the memory subsystem is processing data. The processing described in reference to FIG. 11 allows all read data to be returned to the memory controller 802 in the order in which it was requested by a memory controller 802 read command on an easily predetermined cycle. No tag or valid indicator is required to be returned with the data because the return time and the source of the data is predetermined. Read data commands are sent to the memory modules 806 with an easily determined RDBD value that will prevent collisions from occurring on the read data bus (i.e., the upstream memory bus 902) back to the memory controller 802.

Also as described in reference to FIG. 11, the read data arriving from the memory devices on the memory modules 806 is captured and delayed by the FIFO read buffers by the number of delay cycles indicated in the RDBD in the read command. Read data from the memory module 806 to the memory controller 802 is sourced from the upstream, incoming data unless there is a local data packet to drive towards the memory controller 802. Further, there is no data arbitration logic or flow through buffers in the memory subsystem as all collisions are prevented through intelligent scheduling using the RDBD values.

Figure 12:
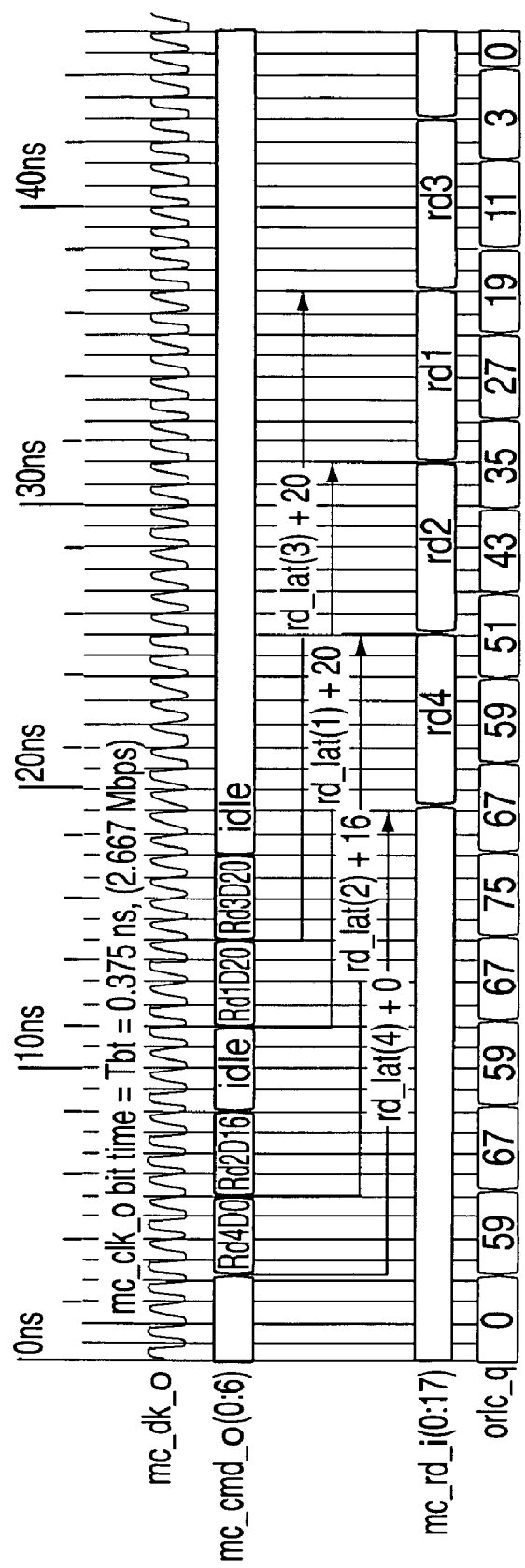
FIG. 12 depicts a timing diagram with four read operations, one to each memory module, in accordance with exemplary embodiments of the present invention.

FIG. 12 depicts a timing diagram with four read operations, one to each memory module, in accordance with exemplary embodiments of the present invention. The memory controller 802 is configured with the read latency look up configuration described in reference to FIG. 11. The memory controller 802 issues four read commands in the command field of downstream frames on signals named "mc_cmd_o(0:6)" on the downstream memory bus 904 with "mc_clk_o" representing the memory controller clock signal, "orlc_q" representing the current value of the ORLC and "mc_rd_$_i$(0:17)" representing the returned read data in an upstream frame on the upstream memory bus 902. In this example, the read data latency for the first memory module 806 is thirty-two transfers, the read data latency for the second memory module 806 is thirty-six transfers, the read data latency for the third memory module 806 is forty transfers, and the read data latency for the fourth memory module 806 is forty-four transfers. The ORLC has an initial value of zero and two transfers occur for each clock cycle with a burst length of four.

At clock cycle five, a read command to the fourth memory module 806 is issued with a RDBD equal to zero and the ORLC is set to fifty-nine: 44 (the read latency for the fourth memory module) plus 16 (four times the burst length of four) minus 1. At clock cycle thirty-one: 9 (clock cycle nine when the read command is completed) plus 0 (for the number of cycles for the RDBD) plus 22 (the number of clock cycles for the read latency of the fourth memory module), the read data from the fourth memory module 806, "rd4", is returned.

In an example, at clock cycle nine, a read command to the second memory module 806 is issued with a RDBD equal to sixteen: 51 (the current value of the ORLC calculated as 59) minus 8 (because 8 more transfers have occurred over the four cycles since clock cycle five) minus 36 (the read latency for the second memory module 806) plus 1. The ORLC is set to sixty seven: 36 (the read latency for the second memory module) plus 16 (the RDBD) plus 16 (four times the burst length of four) minus 1. At clock cycle thirty-nine: 13 (clock cycle thirteen when the read command is completed) plus 8 (the number of cycles for the 16 transfers in the RDBD) plus 18 (the number of cycles for thirty-two transfers in the read latency for the second memory module 806), the read data from the second memory module 806, "rd2", is returned.

At clock cycle 13, no read commands are issued and value of the ORLC is decremented to fifty-nine. The calculations for the remaining cycles for ORLC and RDBD are similar to those described above following the process described in reference to FIG. 11.

Exemplary embodiments of the present invention provide positional read data latency within a memory channel, or memory subsystem, comprised of cascaded, buffered memory modules 806. Positional read data latency is provided without adding undue logic and control complexity. Exemplary embodiments of the present invention do not require latency adding arbitration logic or power consuming critical resource scheduling arrays. Further, the positional read data latency described herein does not slow down the memory subsystem by delaying the issuing of memory commands in order to prevent upstream controller interface collisions.

Exemplary embodiments of the present invention allows commands to be issued by the memory controller 802 as soon as possible without using gaps in the command stream to prevent read data collisions. This may allow the accessed memory cells to begin preparing for future memory accesses without delay. Exemplary embodiments of the present invention allow read data to be returned to the memory controller 802 without gaps in the upstream read data transmissions. Further, read data is returned as soon as possible without the additional delay that may be associated with levelized latency techniques.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for providing positional read data latency in a cascaded interconnect memory subsystem, the method comprising:
  receiving a read request for a target memory module;
  calculating a delay period for the read request, with the delay period selected to prevent a collision with other returned read data on a cascade interconnected bus used to communicate with the target memory module and an additional memory module, wherein the calculating of the delay period is responsive to one or more outstanding read commands previously issued to the memory subsystem and to a minimum read latency associated with the target memory module in consideration of the one or more outstanding read commands;
  transmitting a read command to the target memory module, the read command including the delay period, wherein the target memory module comprises one or more memory devices and one or more read data buffers to hold read data from the one or more memory devices corresponding to the read request; and
  receiving the read data at a memory controller from the target memory module in response to the read command via a cascade interconnected bus, wherein the target memory module has transmitted the read data to the memory controller after the delay period has expired.

2. The method of claim 1 wherein the one or more read data buffers hold the read data for a time specified by the delay period.

3. The method of claim 1 further comprising determining if the one or more read data buffers on the target memory module are available for holding the read data for the delay period specified by the read command, wherein the transmitting of the read command is executed in response to determining that the one or more read data buffers on the target memory module are available.

4. The method of claim 1 wherein the delay period is greater than zero.

5. The method of claim 1 wherein the delay period is equal to zero.

6. The method of claim 1 wherein the delay period is expressed in terms of data transfers.

7. The method of claim 1 wherein the delay period is expressed in terms of clock cycles.

* * * * *